US011945079B2

(12) United States Patent
Nelson et al.

(10) Patent No.: US 11,945,079 B2
(45) **Date of Patent: *Apr. 2, 2024**

(54) SCREWDRIVER

(71) Applicant: Milwaukee Electric Tool Corporation, Brookfield, WI (US)

(72) Inventors: Collin J. Nelson, Milwaukee, WI (US); Steven W. Hyma, Milwaukee, WI (US); Grant T. Squiers, Cudahy, WI (US); James A. Cemke, Jr., Richfield, WI (US); Abhijeet A. Khangar, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/216,100

(22) Filed: Mar. 29, 2021

(65) Prior Publication Data

US 2021/0213590 A1 Jul. 15, 2021

Related U.S. Application Data

(63) Continuation of application No. 15/924,811, filed on Mar. 19, 2018, now Pat. No. 10,987,783, which is a (Continued)

(51) Int. Cl.
*B25G 1/08* (2006.01)
*B25B 15/00* (2006.01)
(Continued)

(52) U.S. Cl.
CPC .............. *B25B 15/04* (2013.01); *B25B 15/00* (2013.01); *B25B 23/12* (2013.01); *B25G 1/085* (2013.01)

(58) Field of Classification Search
CPC ....... B25B 13/463; B25B 15/00; B25B 15/02; B25B 15/04; B25B 13/465; B25B 13/468; (Continued)

(56) References Cited

U.S. PATENT DOCUMENTS 2,658,766 A 11/1953 Rock
3,667,518 A 6/1972 Stillwagon, Jr.
(Continued)

FOREIGN PATENT DOCUMENTS

EP 1028831 11/2002
EP 1512494 6/2008
(Continued)

*Primary Examiner* — Robert J Scruggs
(74) *Attorney, Agent, or Firm* — Reinhart Boerner Van Deuren s.c.

(57) ABSTRACT

A screwdriver includes a main body and a switch. The main body is coupled to a handle and includes a pair of parallel, spaced apart slots, and a pawl positioned in each slot. Each pawl is biased outwardly by a spring. The switch is pivotable relative to the main body, and the switch includes a groove extending along an arcuate portion of an inner surface. Pivoting the switch in a first direction moves the switch toward a first position in which the groove is positioned in-line with the first pawl. When the switch is in the first position, the first pawl extends outwardly from the slot and engages the internal tooth surface such that application of a torque in a first direction drives a shank in the first direction and application of a torque in the second direction causes the shank to ratchet relative to the main body.

8 Claims, 9 Drawing Sheets

Related U.S. Application Data continuation of application No. 14/599,072, filed on Jan. 16, 2015, now Pat. No. 9,931,739.

(60) Provisional application No. 61/968,611, filed on Mar. 21, 2014, provisional application No. 61/928,243, filed on Jan. 16, 2014.

(51) Int. Cl.
*B25B 15/04* (2006.01)
*B25B 23/12* (2006.01)

(58) Field of Classification Search
CPC ....... B25B 13/461; B25B 23/12; B25B 23/16; B25B 17/00; B25B 19/00; B25B 23/00; B25G 1/085
See application file for complete search history.

(56) References Cited

U.S. PATENT DOCUMENTS

| | | | | |
|---|---|---|---|---|
| 4,235,269 | A * | 11/1980 | Kraus | B25B 15/04 81/177.4 |
| 4,463,788 | A | 8/1984 | Corona et al. | |
| 4,480,668 | A | 11/1984 | Lin | |
| 4,777,852 | A | 10/1988 | Herman et al. | |
| 4,924,733 | A | 5/1990 | McKenzie | |
| 5,265,504 | A | 11/1993 | Fruhm | |
| 5,341,707 | A | 8/1994 | Bond | |
| 5,421,224 | A | 6/1995 | Bond | |
| 5,437,212 | A | 8/1995 | Thompson et al. | |
| 5,535,648 | A | 7/1996 | Braun et al. | |
| 5,537,899 | A | 7/1996 | Diedrich | |
| 5,570,616 | A | 11/1996 | Thompson et al. | |
| 5,579,668 | A | 12/1996 | Kozak | |
| 5,595,294 | A | 1/1997 | McKenzie et al. | |
| 5,619,891 | A | 4/1997 | Tiede | |
| 5,638,727 | A | 6/1997 | Gringer | |
| 5,771,760 | A | 6/1998 | Tiede | |
| 5,778,743 | A | 7/1998 | Tiede | |
| 5,983,757 | A | 11/1999 | Blise et al. | |
| 6,029,549 | A | 2/2000 | Baker | |
| 6,047,802 | A | 4/2000 | Huang | |
| 6,059,083 | A | 5/2000 | Tseng | |
| 6,101,901 | A | 8/2000 | Daigle | |
| 6,209,422 | B1 | 4/2001 | Kamiya et al. | |
| 6,250,183 | B1 | 6/2001 | Chiang | |
| 6,293,173 | B1 | 9/2001 | Rowlay | |
| 6,327,942 | B1 * | 12/2001 | Mariol | B25G 1/085 81/177.4 |
| 6,332,384 | B1 | 12/2001 | Cluthe | |
| 6,349,619 | B1 | 2/2002 | Liao | |
| 6,370,988 | B1 | 4/2002 | Thompson et al. | |
| 6,374,711 | B2 | 4/2002 | Anderson et al. | |
| 6,443,037 | B1 * | 9/2002 | Chang | B25G 1/085 81/177.4 |
| 6,523,439 | B1 | 2/2003 | Huang | |
| 6,568,298 | B1 | 5/2003 | Zinck | |
| 6,568,693 | B2 | 5/2003 | Glass | |
| 6,575,062 | B2 | 6/2003 | Hahn | |
| 6,622,597 | B2 | 9/2003 | Chen | |
| 6,644,147 | B1 | 11/2003 | Huang | |
| 6,925,912 | B2 | 8/2005 | Huang | |
| 6,935,211 | B2 | 8/2005 | Chen | |
| 6,976,409 | B2 | 12/2005 | Shu | |
| 7,014,023 | B1 | 3/2006 | Gauthier | |
| 7,021,181 | B1 | 4/2006 | Chi | |
| 7,028,593 | B1 | 4/2006 | Lin et al. | |
| 7,036,399 | B1 | 5/2006 | Gao et al. | |
| 7,039,975 | B1 * | 5/2006 | Liao | B25B 23/12 81/177.85 |
| 7,044,029 | B1 | 5/2006 | Hopper, Jr. et al. | |
| 7,080,582 | B2 | 7/2006 | Karle | |
| 7,086,314 | B2 | 8/2006 | Wannop | |
| 7,134,368 | B2 | 11/2006 | Nagy | |
| 7,137,320 | B2 | 11/2006 | Tuan-Mu | |
| 7,168,342 | B2 | 1/2007 | Gao et al. | |
| 7,174,810 | B1 | 2/2007 | Lin | |
| 7,181,997 | B1 | 2/2007 | Rinner et al. | |
| 7,222,557 | B2 | 5/2007 | Li et al. | |
| 7,225,708 | B2 | 6/2007 | Chen | |
| 7,237,459 | B1 | 7/2007 | Shiao | |
| 7,275,466 | B2 | 10/2007 | Cluthe | |
| 7,281,455 | B2 | 10/2007 | Hu | |
| 7,305,908 | B2 * | 12/2007 | Chi | B25G 1/085 81/177.4 |
| 7,311,186 | B2 | 12/2007 | Liao | |
| 7,334,509 | B1 | 2/2008 | Gao | |
| 7,347,127 | B2 | 3/2008 | Hu | |
| 7,380,482 | B1 | 6/2008 | Chan | |
| 7,434,493 | B2 | 10/2008 | Huang | |
| 7,503,104 | B2 | 3/2009 | Rinner et al. | |
| D596,473 | S | 7/2009 | McKenzie | |
| 7,587,962 | B2 | 9/2009 | Marks et al. | |
| 7,793,573 | B2 | 9/2010 | Gao | |
| 7,926,391 | B2 | 4/2011 | Hu | |
| 7,938,045 | B2 | 5/2011 | Itoh | |
| 7,950,311 | B2 | 5/2011 | Chen | |
| 7,954,402 | B2 | 6/2011 | Crawford | |
| 7,992,472 | B2 | 8/2011 | Gao | |
| 8,096,214 | B2 | 1/2012 | Gao | |
| 8,109,182 | B2 | 2/2012 | Chen | |
| 8,122,791 | B2 | 2/2012 | Klomp | |
| D684,836 | S | 6/2013 | Wong | |
| 8,453,543 | B2 | 6/2013 | Floyd | |
| 8,522,651 | B2 | 9/2013 | Xu | |
| 10,987,783 | B2 * | 4/2021 | Nelson | B25G 1/085 |
| 2006/0065080 | A1 | 3/2006 | Davidson et al. | |
| 2006/0191381 | A1 | 8/2006 | Gao et al. | |
| 2007/0000356 | A1 | 1/2007 | Staples | |
| 2007/0240544 | A1 | 10/2007 | Hu | |
| 2007/0243763 | A1 | 10/2007 | Hu | |
| 2008/0092695 | A1 | 4/2008 | Hernandez | |
| 2008/0276770 | A1 | 11/2008 | Blum et al. | |
| 2010/0116097 | A1 | 5/2010 | Xu | |
| 2011/0005358 | A1 | 1/2011 | Sun | |
| 2011/0296959 | A1 | 12/2011 | Kibby | |
| 2012/0048068 | A1 | 3/2012 | Xu | |
| 2013/0055507 | A1 | 3/2013 | Li et al. | |
| 2013/0055861 | A1 | 3/2013 | Wang | |
| 2013/0263706 | A1 | 10/2013 | Safar | |
| 2013/0333526 | A1 | 12/2013 | Chen | |

FOREIGN PATENT DOCUMENTS

| | | |
|---|---|---|
| EP | 2221147 | 8/2010 |
| EP | 2511048 | 10/2012 |
| WO | WO9702927 | 1/1997 |
| WO | WO2009010170 | 1/2009 |
| WO | WO2009015871 | 2/2009 |

* cited by examiner

SCREWDRIVER

CROSS-REFERENCE TO RELATED APPLICATIONS

This application is a continuation of U.S. application Ser. No. 15/924,811, filed on Mar. 19, 2018, which is a continuation of U.S. patent application Ser. No. 14/599,072, now U.S. Pat. No. 9,931,739, filed Jan. 16, 2015, which claims the benefit of and priority to U.S. Provisional Application No. 61/928,243, filed Jan. 16, 2014, and U.S. Provisional Application No. 61/968,611, filed Mar. 21, 2014, which are incorporated herein by reference in their entireties.

BACKGROUND

The present invention relates to hand tools and, in particular, to a screwdriver.

Conventional screwdrivers include a handle and a shank portion. The shank portion may include a bore for receiving a removable bit, and the bit may be retained in the bore magnetically. The screwdriver may also include a ratchet mechanism to permit the handle to rotate relative to the shank when a user applies a torque to the handle in one direction.

SUMMARY

In one embodiment, a screwdriver includes a handle, a main body, a first pawl, a second pawl, a shank, a bit, and a switch. The handle includes a first end and a second end and defines an axis therebetween. The main body includes a first portion and a second portion. The first portion is secured within the handle and the second portion includes a pair of slots. The slots are oriented parallel to and spaced apart from one another, and the slots are positioned symmetrically on either side of the axis such that each slot is laterally offset from the axis by an equal distance. The main body further including a spring positioned in each slot. The first pawl is positioned within one of the slots and is biased outwardly from the slot by one of the springs. The first pawl includes a first tooth. The second pawl is positioned within the other of the slots and is biased outwardly from the slot by the other spring. The second pawl includes a second tooth. The shank is coupled to the main body proximate the second portion and includes a first end and second end. The first end has a circular internal tooth surface aligned concentrically with the axis. The internal tooth surface extends circumferentially around a portion of the second body. The second end has a bore. The bit is removably received within the bore of the shank. The switch is positioned between the handle and the shank and is pivotable relative to the main body about the axis. The switch includes an inner surface extending around at least a portion of the first pawl and the second pawl. The switch includes a groove extending along an arcuate portion of the inner surface, and the groove is positioned radially outwardly from the inner surface relative to the axis. Pivoting the switch in a first direction about the axis moves the switch toward a first position in which the groove is positioned in-line with the first pawl. Pivoting the switch in the second direction about the axis opposite the first direction moves the switch toward a second position in which the groove is positioned in-line with the second pawl. When the switch is in the first position, the first pawl extends outwardly from the slot and the first tooth engages the internal tooth surface of the shank such that application of a torque to the handle in a first direction about the axis drives the shank in the first direction. Application of a torque in the second direction about the axis causes the shank to ratchet relative to the main body and handle.

In another embodiment, a screwdriver includes a handle, a main body, a first pawl, a second pawl, a shank, and a switch. The handle includes a first end and a second end and defines an axis therebetween. The handle includes an opening extending from the first end at least partially toward the second end. The main body includes a first portion and a second portion. The first portion is received within the opening of the handle, and the second portion includes a pair of slots oriented parallel to and spaced apart from one another. The slots are positioned symmetrically on either side of the axis such that each slot is laterally offset from the axis by an equal distance. The main body further includes a spring positioned in each slot. The first pawl is positioned within one of the slots and is biased outwardly from the slot by one of the springs. The first pawl includes a first tooth. The second pawl is positioned within the other of the slots and is biased outwardly from the slot by the other spring. The second pawl includes a second tooth. The shank is coupled to the main body proximate the second portion, and the shank includes a first end and second end. The first end has a circular internal tooth surface aligned concentrically with the axis. The internal tooth surface extends circumferentially around a portion of the second body. The second end has a bore configured to receive a bit. The switch is positioned between the handle and the shank and pivotable relative to the main body about the axis. The switch includes an inner surface extending around at least a portion of the first pawl and the second pawl. The switch includes a groove extending along an arcuate portion of the inner surface. The groove is positioned radially outwardly from the inner surface with respect to the axis. The switch is pivotable between a first position, a second position, and a third position between the first position and the second position. The switch is pivoted a maximum distance in a first direction about the axis to move the switch to the first position, and the switch is pivoted a maximum distance in a second direction about the axis opposite the first direction to move the switch to the second position. When the switch is in the first position, the groove is positioned in-line with the slot of the first pawl, thereby permitting the first pawl to extend outwardly such that the first tooth engages the internal tooth surface of the shank. Application of a torque to the handle in a first direction about the axis drives the shank in the first direction while application of a torque in the second direction about the axis causes the shank to ratchet relative to the main body and handle.

In yet another embodiment, a screwdriver includes a handle, a shank, and a bit. The handle includes a first end and a second end, and defines an axis therebetween. The handle includes a body portion proximate the first end and a neck portion positioned adjacent the body portion. The neck portion has a diameter less than a diameter of the body portion. The body portion includes a plurality of holes extending through the body portion parallel to the axis. The holes are angularly spaced apart about the axis, and each hole defines an opening positioned adjacent the neck portion and configured to receive a removable bit. The shank is coupled to the handle and includes a first end and second end. The second end has a bore. The bit is removably received within the bore of the shank.

Other independent aspects of the invention will become apparent by consideration of the detailed description and accompanying drawings.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

DETAILED DESCRIPTION

Figure 1:
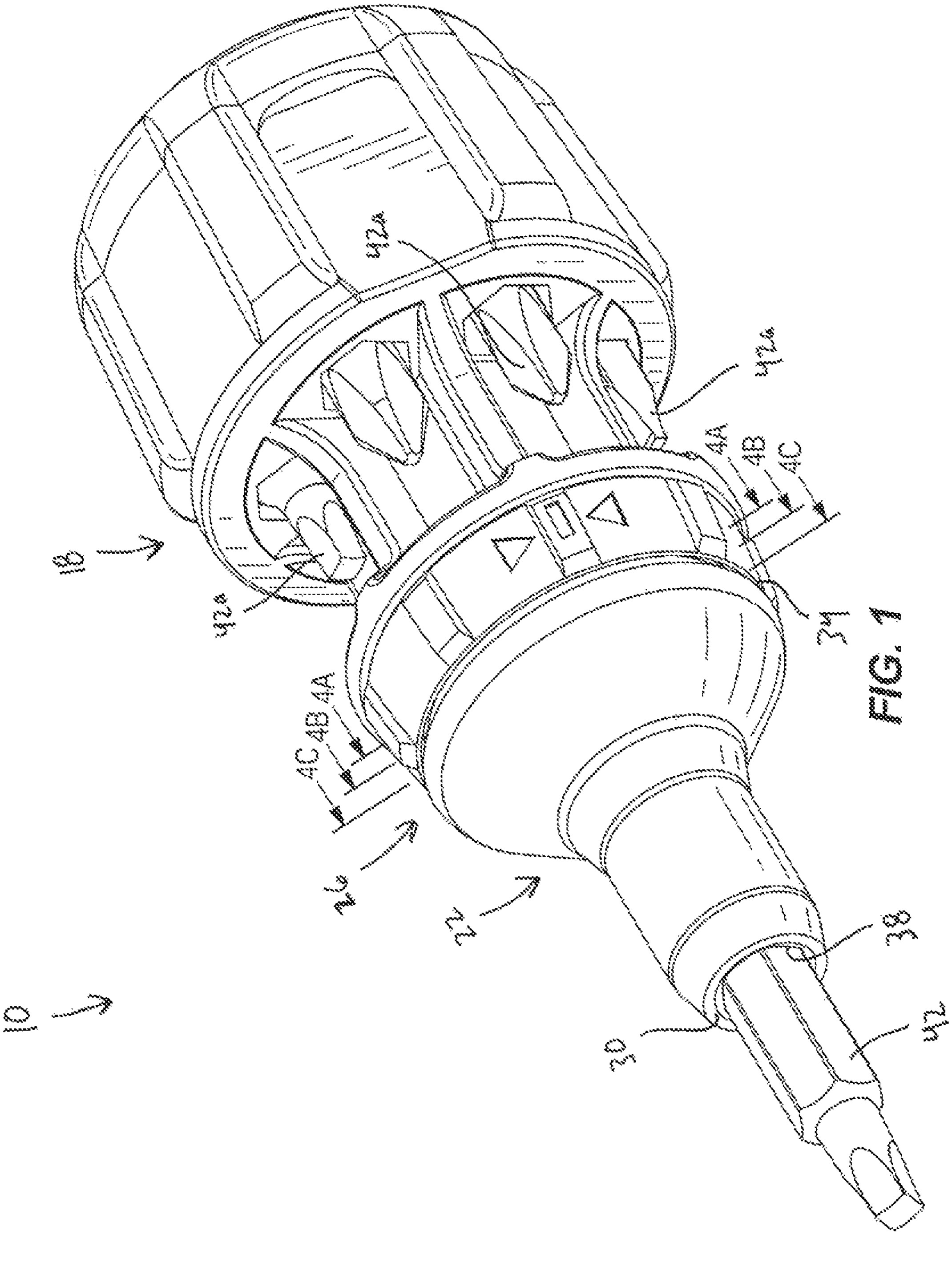
FIG. 1 is a perspective view of a screwdriver.
Figures 2, 3:
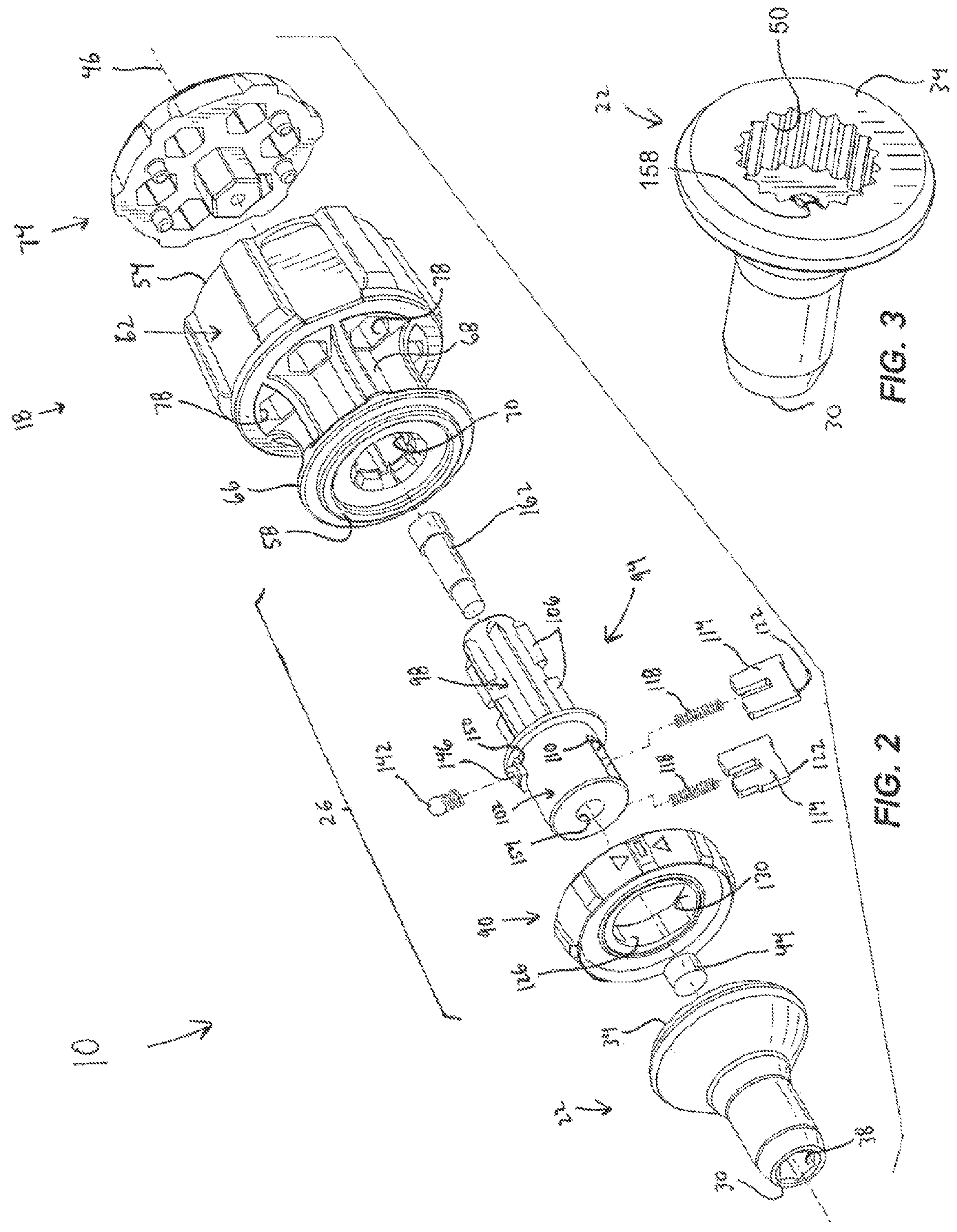
FIG. 2 is an exploded view of the screwdriver of FIG. 1.
FIG. 3 is a perspective view of a shank.

FIGS. 1 and 2 illustrates a screwdriver 10 includes a handle 18, a shank 22, and a ratchet assembly 26. The shank 22 includes a first end 30 and a second end 34. The first end 30 includes a bore 38 that removably supports a bit 42. In one embodiment, the bit 42 is retained within the bore 38 by a magnet 44 (FIG. 2). The second end 34 of the shank 22 includes an internal tooth surface 50 (FIG. 3).

As shown in FIG. 2, the handle 18 includes a first end 54 and a second end 58, and defines a longitudinal axis 46 extending therebetween. In the illustrated embodiment, the handle 18 defines a body portion 62 proximate the first end 54, a rim 66 proximate the second end 58, and a neck portion 68 positioned between the body portion 62 and the rim 66. The neck portion 68 has a smaller diameter than the body portion 62 and the rim 66. The handle 18 further includes an opening 70 extending along the axis 46. A cap 74 is secured to the first end 54 of the handle 18 and closes the opening 70.

FIG. 2 shows that the body portion 62 also includes holes 78 positioned around the axis 46. The holes 78 are oriented parallel to the axis 46 and extend through the body portion 62 and the cap 74. Each hole 78 supports an alternate bit 42*a*, providing convenient storage of the bits 42*a* and permitting easy access to the bits 42*a* when needed. The bit 42 may be removed from the bore 38 of the shank 22 and replaced with one of the alternate bits 42*a*. In the embodiment illustrated in FIG. 1, a working end of each bit 42*a* protrudes from each hole 78 of the body portion 62 and are positioned adjacent the neck portion 68. Since the working ends are exposed, the user can readily identify the type and size of bit 42*a* stored in each hole 78 when the bit 42 needs to be changed.

In the illustrated embodiments, the handle 18 has holes 78 to hold six bits 42*a*; in other embodiments, the handle 18 may include fewer or more holes 78 to store fewer or more bits 42*a*. Also, the illustrated embodiments indicate that the bits 42*a* may be square bits, flat bits, or Philips bits; in other embodiments, the bits 42*a* may have another type or another size. In some embodiments, a grommet is positioned at least partially within each hole 78 to retain each bit 42*a* within a respective hole 78. In the embodiment of FIGS. 1 and 2, the rim 66 prevents the stored bits 42*a* from passing completely through the holes 78 toward the shank 22.

Referring again to FIG. 2, the ratchet assembly 26 includes a selector switch 90 and a mandrel or main body 94. The main body 94 includes a first portion 98 and a second portion 102. The first portion 98 is at least partially received within the opening 70 of the handle 18 and includes multiple radial projections 106 for securing the first portion 98 relative to the inner surface of the opening 70 (e.g., by an interference fit between the projections 106 and the opening 70). The second portion 102 includes two slots 110 (FIGS. 4B and 4C), each of which receives a pawl 114. In the illustrated embodiment, the slots 110 are parallel to one another and offset from the axis 46, and the slots 110 are each spaced from the axis 46 by an equal lateral distance. Each pawl 114 is biased by a spring 118 outwardly from the second portion 102 of the main body 94. An outer surface of each pawl 114 includes a tooth 122 for engaging the internal tooth surface 50 of the shank 22.

In the illustrated embodiment, the switch 90 is formed as a ring extending around a portion of the main body 94. The switch 90 is pivotable about the longitudinal axis 46 relative to the main body 94, and the switch 90 includes an inner wall 126 and a groove 130 formed in the inner wall 126. The groove 130 defines a surface that is spaced farther from the axis 46 than the rest of the inner wall 126. The inner wall 126 also includes three pockets 134 (FIG. 4A) formed separate from the groove 130. In the illustrated embodiment, the switch 90 abuts an end of the shank 22 adjacent the internal tooth surface 50 (FIG. 3). The inner wall 126 engages the pawls 114 to push the pawls 114 into their respective slots 110 against the biasing force of the springs. When the switch 90 is rotated such that the groove 130 is aligned with one of the pawls 114, the aligned pawl 114 slides along an inclined side surface of the groove 130 and extends outwardly from the slot 110. The tooth 122 of the aligned pawl 114 engages the internal tooth surface 50. The handle 18 and main body 94 will ratchet (i.e., rotate relative to the shank 22) in one direction depending on which pawl 114 is extended to engage the internal tooth surface 50.

As shown in FIG. 2, a retention mechanism includes a ball 142 that is positioned within a hole 146 of the second portion

102 of the main body 94. The ball 142 is biased radially outwardly relative to the axis 46. The ball 142 is received within one of the pockets 134 formed in the inner wall 126 of the switch 90. The ball 142 resists unintentional rotation of the switch 90 relative to the main body 94. Also, a protrusion 150 formed around the hole 146 acts as a stop to limit the rotation of the switch 90 in each direction.

In the illustrated embodiment, the main body 94 includes a hole 154 aligned with the axis 46 and extending through the first portion 98 and the second portion 102. The shank 22 also includes a hole 158 (FIG. 3) aligned with the axis 46. A fastener 162 (e.g., a threaded bolt) extends through the hole 154 of the main body 94 and engages the hole 158 of the shank 22, thereby securing the main body 94 relative to the shank 22 and securing the switch 90 between the shank 22 and the main body 94. The magnet 44 is positioned within the hole 158 of the shank 22, between the fastener 162 and the removable bit 42.

Figure 4C:
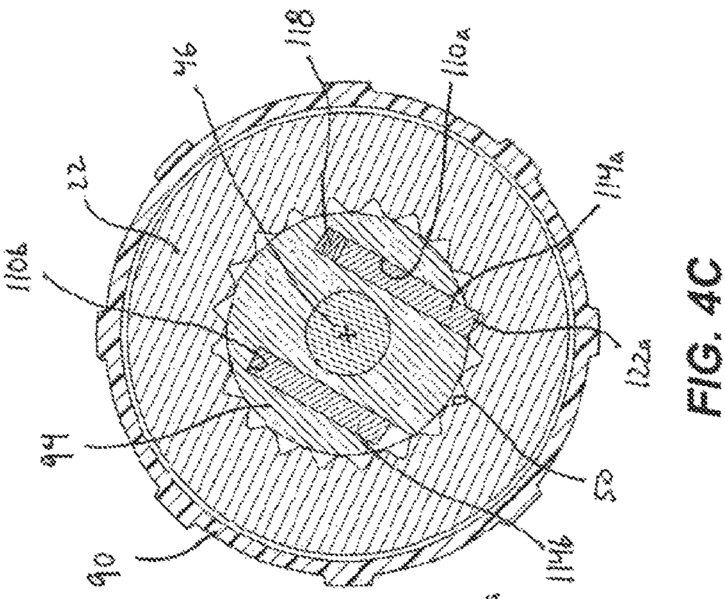
FIG. 4C is a section view of the screwdriver of FIG. 1 viewed along section 4C-4C, with a switch in a first position.
Figure 4B:
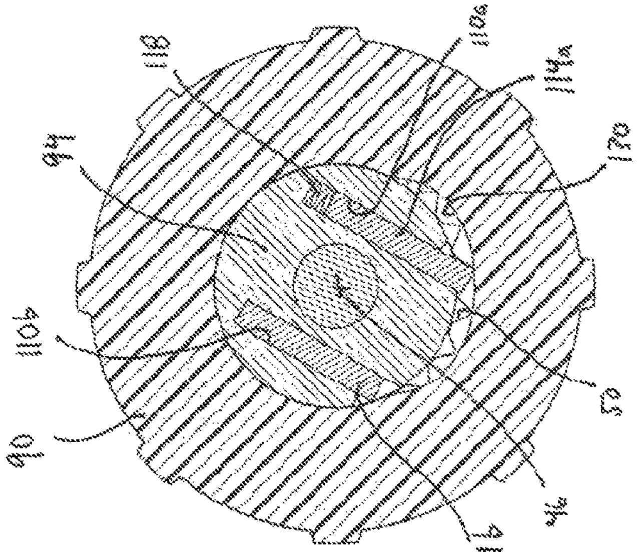
FIG. 4B is a section view of the screwdriver of FIG. 1 viewed along section 4B-4B, with a switch in a first position.
Figure 4A:
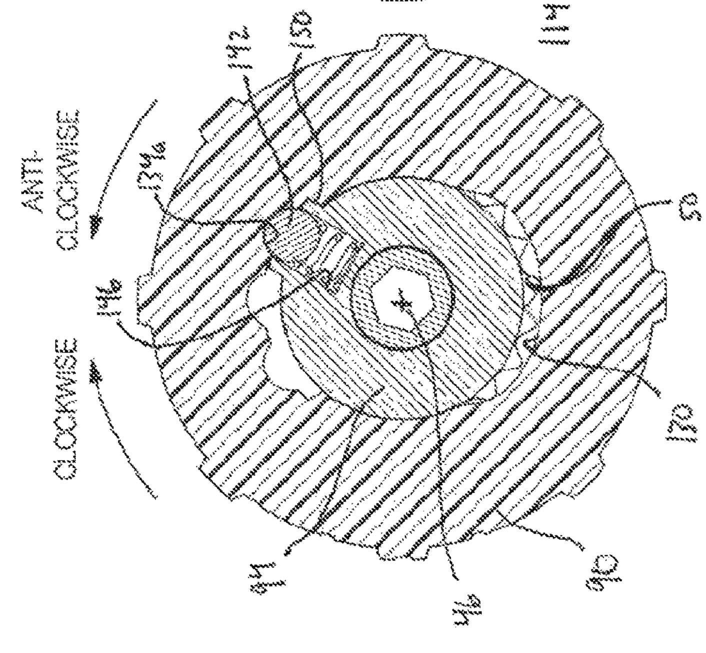
FIG. 4A is a section view of the screwdriver of FIG. 1 viewed along section 4A-4A, with a switch in a first position.

FIGS. 4A-4C illustrate the position of the pawls 114 and ball 142 when the switch 90 is pivoted to a first position. In particular, the switch 90 in FIGS. 4A-4C is pivoted to the furthest extent possible in the anti-clockwise direction relative to the main body 94. In the illustrated embodiment, the protrusion 150 (FIG. 4A) of the main body 94 engages a surface of the switch 90 to prevent further rotation in the anti-clockwise direction. As shown in FIG. 4A, the ball 142 is received within a first pocket 134*a*. As shown in FIGS. 4B and 4C, the switch 90 is positioned such that the groove 130 is in-line with the slot 110 of a first pawl 114*a*. As the switch 90 moves to the first position, the first pawl 114*a* slides along the inclined surface of the groove 130 and extends into the groove 130 due to the spring bias. The pawl 114*a* engages the teeth of the internal tooth surface 50.

In the illustrated position, the main body 94 and handle 18 ratchets or rotate relative to the shank 22 in a clockwise direction when the user applies a clockwise torque on the handle 18 (and therefore the main body 94) sufficient to overcome the biasing force exerted on the extended first pawl 114*a*. Conversely, applying torque in the opposite or driving direction (i.e., anti-clockwise in FIGS. 4A-4C) will cause the internal tooth surface 50 to engage a side of the pawl 114*a* and rotate the shank 22 and bit 42 together with the handle 18. Therefore, the driving direction of the main body 94 complements the rotation direction of the switch 90 since the switch 90 cannot rotate further.

Figure 5C:
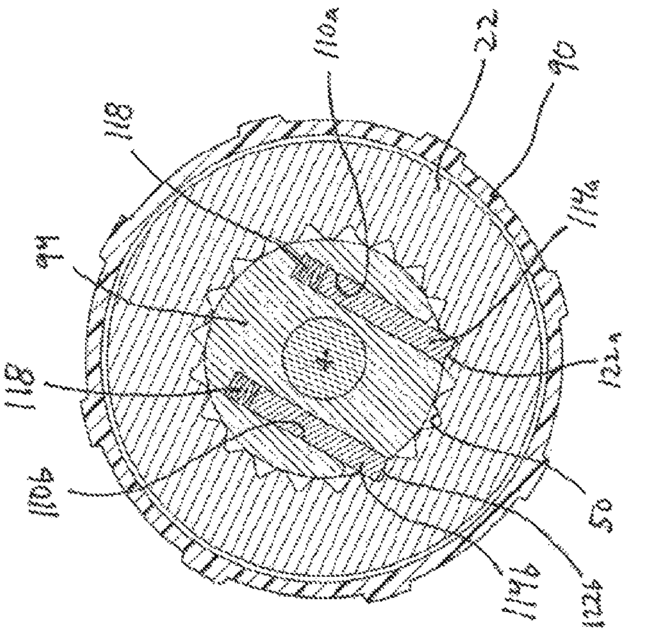
FIG. 5C is a section view of the screwdriver of FIG. 1 viewed along section 4C-4C, with a switch in a second position.
Figure 5B:
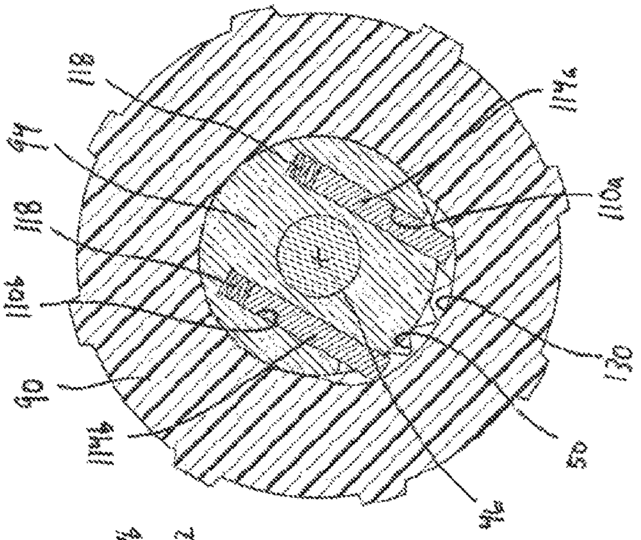
FIG. 5B is a section view of the screwdriver of FIG. 1 viewed along section 4B-4B, with a switch in a second position.
Figure 5A:
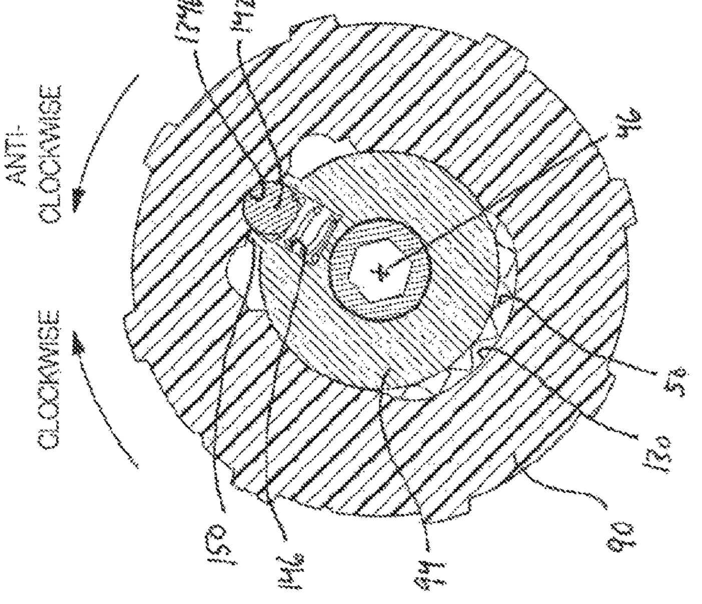
FIG. 5A is a section view of the screwdriver of FIG. 1 viewed along section 4A-4A, with a switch in a second position.

FIGS. 5A-5C illustrate the position of the pawls 114 and the ball 142 when the switch 90 is pivoted to a second position. The switch 90 is in an intermediate position such that the ball 142 is positioned within a second pocket 134*b* and the single groove 130 is in-line with the slots 110 of both pawls 114. Both pawls 114 extend into the groove 130. In this position, applying a torque in either direction will cause the internal tooth surface 50 to catch on a side of one of the pawls 114. Therefore, the main body 94 and the handle 18 will drive the shank 22 to rotate about the axis when a torque is applied to the handle in either direction.

Figure 6C:
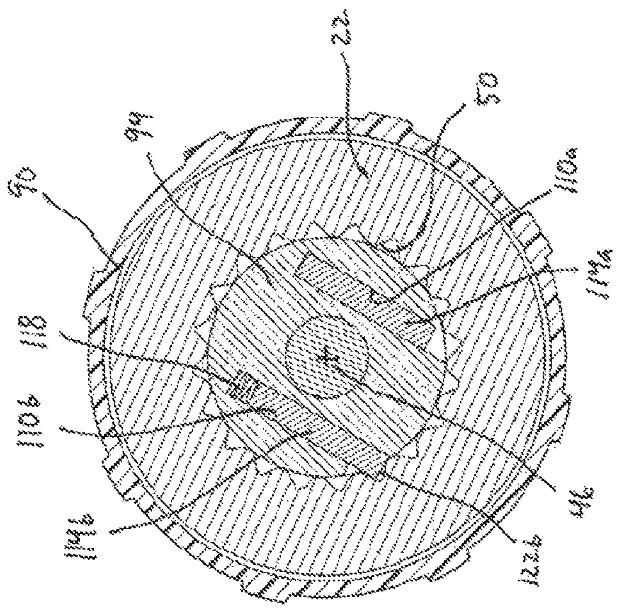
FIG. 6C is a section view of the screwdriver of FIG. 1 viewed along section 4C-4C, with a switch in a third position.
Figure 6B:
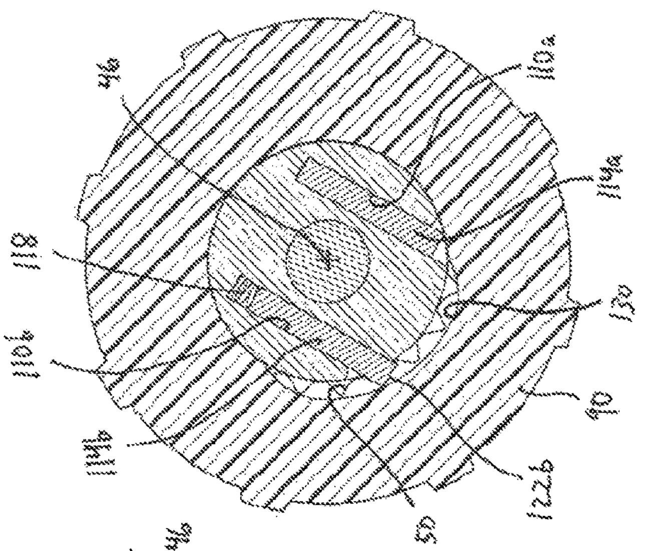
FIG. 6B is a section view of the screwdriver of FIG. 1 viewed along section 4B-4B, with a switch in a third position.
Figure 6A:
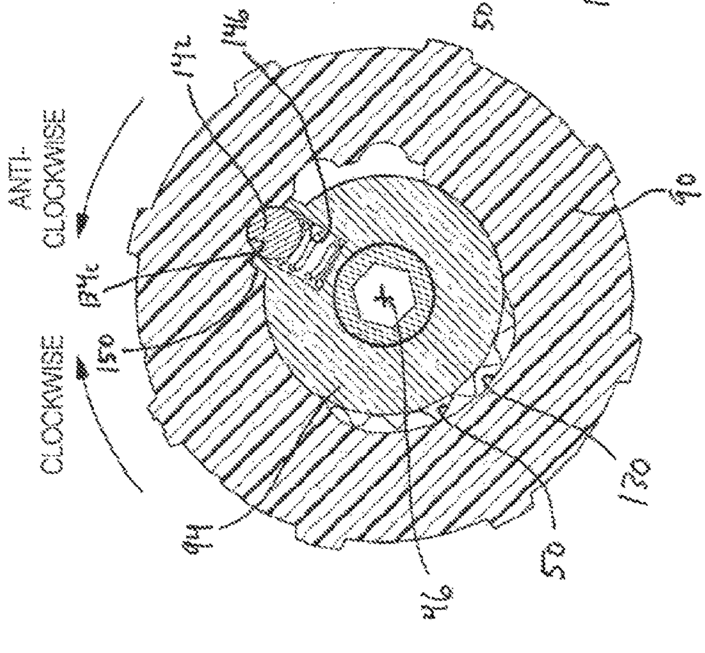
FIG. 6A is a section view of the screwdriver of FIG. 1 viewed along section 4A-4A, with a switch in a third position.

FIGS. 6A-6C illustrate the position of the pawls 114 and the ball 142 when the switch 90 is pivoted to a third position. The switch 90 is pivoted to the furthest extent possible in the clockwise direction relative to the main body 94. In the illustrated embodiment, the protrusion 150 (FIG. 6A) of the main body 94 engages another surface of the switch 90 to prevent further rotation in the clockwise direction. As shown in FIG. 5A, the ball 142 is received within a third pocket 134*c*. As shown in FIGS. 6B and 6C, the switch 90 is positioned such that the groove 130 is in-line with the slot 110 of a second pawl 114*b*. The second pawl 114*b* extends into the groove 130 due to the spring bias and engages the teeth of the internal tooth surface 50.

In the illustrated position, the main body 94 and handle 18 ratchets or rotate relative to the shank 22 in an anti-clockwise direction when the user applies an anti-clockwise torque on the handle 18 sufficient to overcome the biasing force exerted on the extended second pawl 114*b*. Conversely, applying torque in the opposite or driving direction (i.e., clockwise in FIGS. 6A-6C) will cause the internal tooth surface 50 to engage the side of the pawl 114*b* and rotate the shank 22 and bit 42 together with the handle 18. As discussed above with respect to FIGS. 4A-4C, the driving direction of the main body 94 complements the rotation direction of the switch 90 since the switch 90 cannot rotate further.

The ratchet assembly 26 prevents accidental shifting of the switch 90 during use that may occur when the user's fingers slip and apply torque to the switch 90. Since the switch 90 is rotated in the same direction as the driving direction of the shank 22, the user will not accidentally rotate the switch 90 relative to the main body 94. The switch 90 incorporates a single groove that can be aligned with both pawls 114 at the same time.

Figure 7:
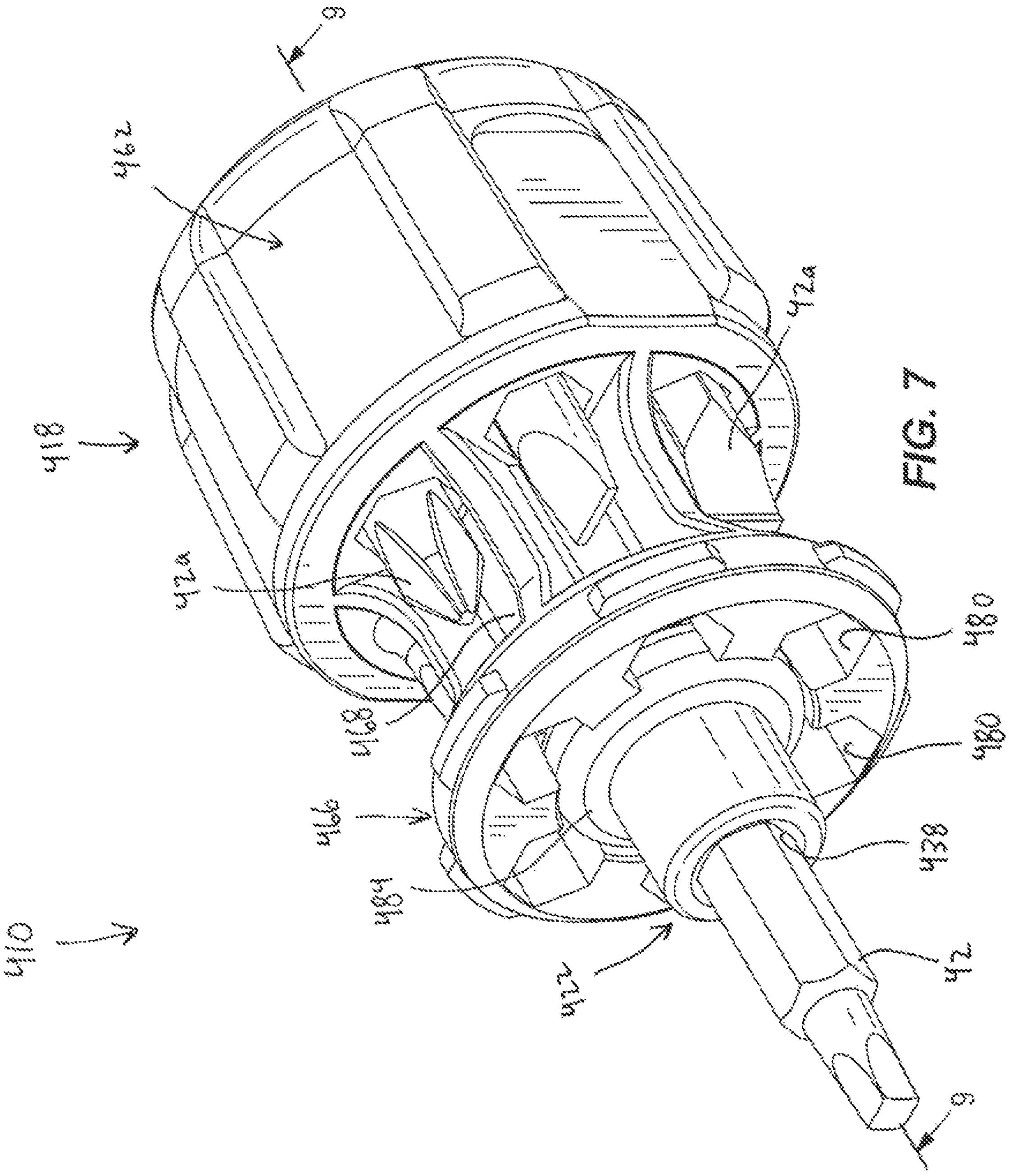
FIG. 7 is a perspective view of a screwdriver according to another embodiment.
Figure 8:
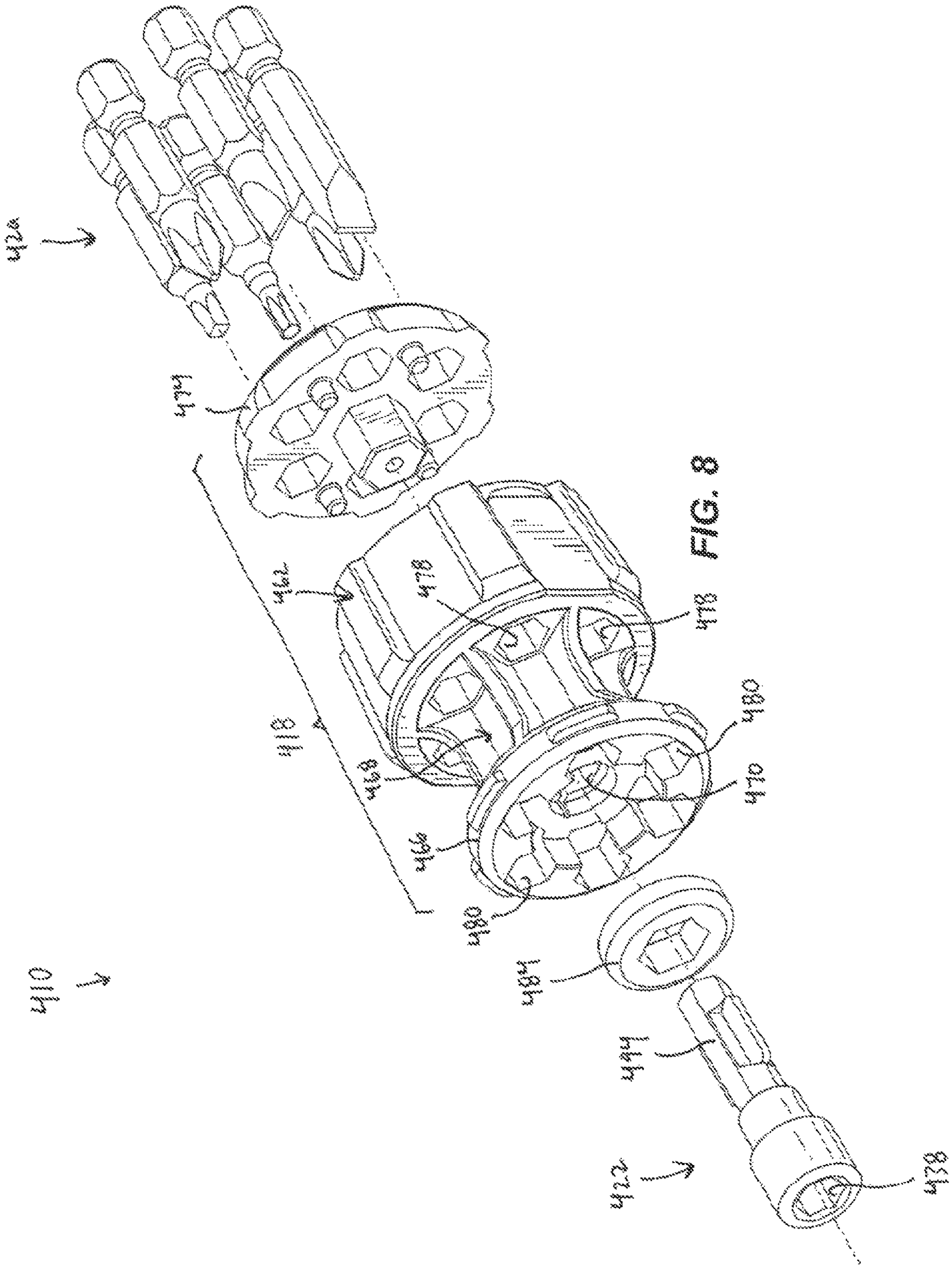
FIG. 8 is an exploded view of the screwdriver of FIG. 7.
Figure 9:
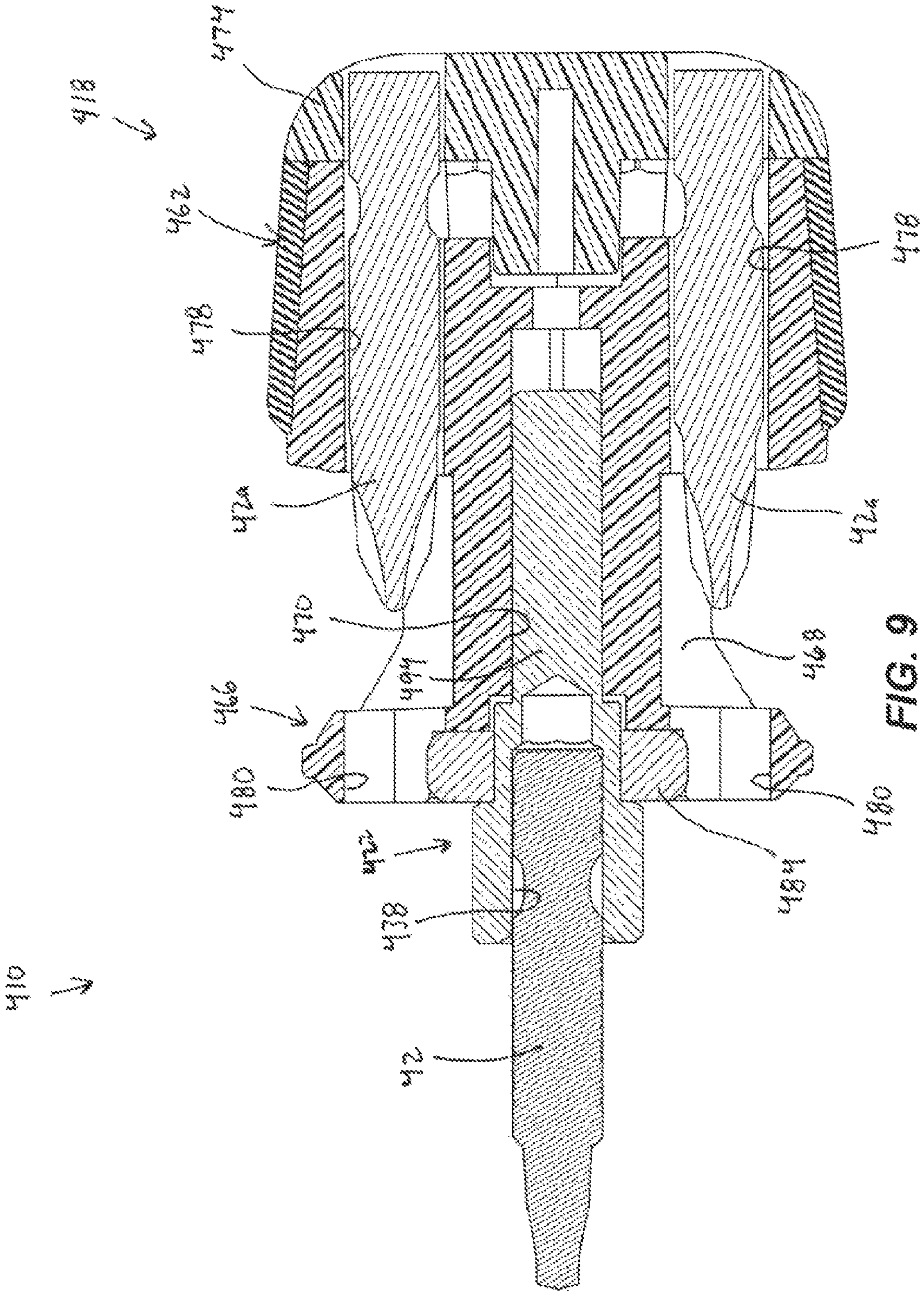
FIG. 9 is a section view of the screwdriver of FIG. 7 viewed along section 7-7.

FIGS. 7-9 illustrate a screwdriver 410 according to another embodiment. For the purposes of brevity, features of the screwdriver 410 that are similar to the features of the screwdriver 10 are referred to by similar reference numbers, plus 400.

The screwdriver 410 includes a handle 418 and a shank 422. The shank 422 is formed integrally with a mandrel 494 (FIGS. 8 and 9) that is secured within an opening 470 (FIGS. 8 and 9) in the handle 418 (e.g., by a press fit). In addition, the handle 418 includes a rim 466 having holes 480 aligned with the holes 478 of the body portion 462, such that the alternate bits 42*a* stored in the holes 478 of the body portion 462 may pass straight through the holes 480 of the rim 466. Thus, the user may remove each bit 42*a* from either the first end 430 or the second end 434 of the handle 418. In some embodiments, the bits 42*a* may be stored such that the bits 42*a* extend between the body portion 462 and the rim 466, such that a central portion of each bit 42*a* is exposed and the user may read the type and size of the bit 42*a* printed on the exposed portion. A grommet 484 is positioned around the shank 422 proximate the rim 466.

Figure 10:
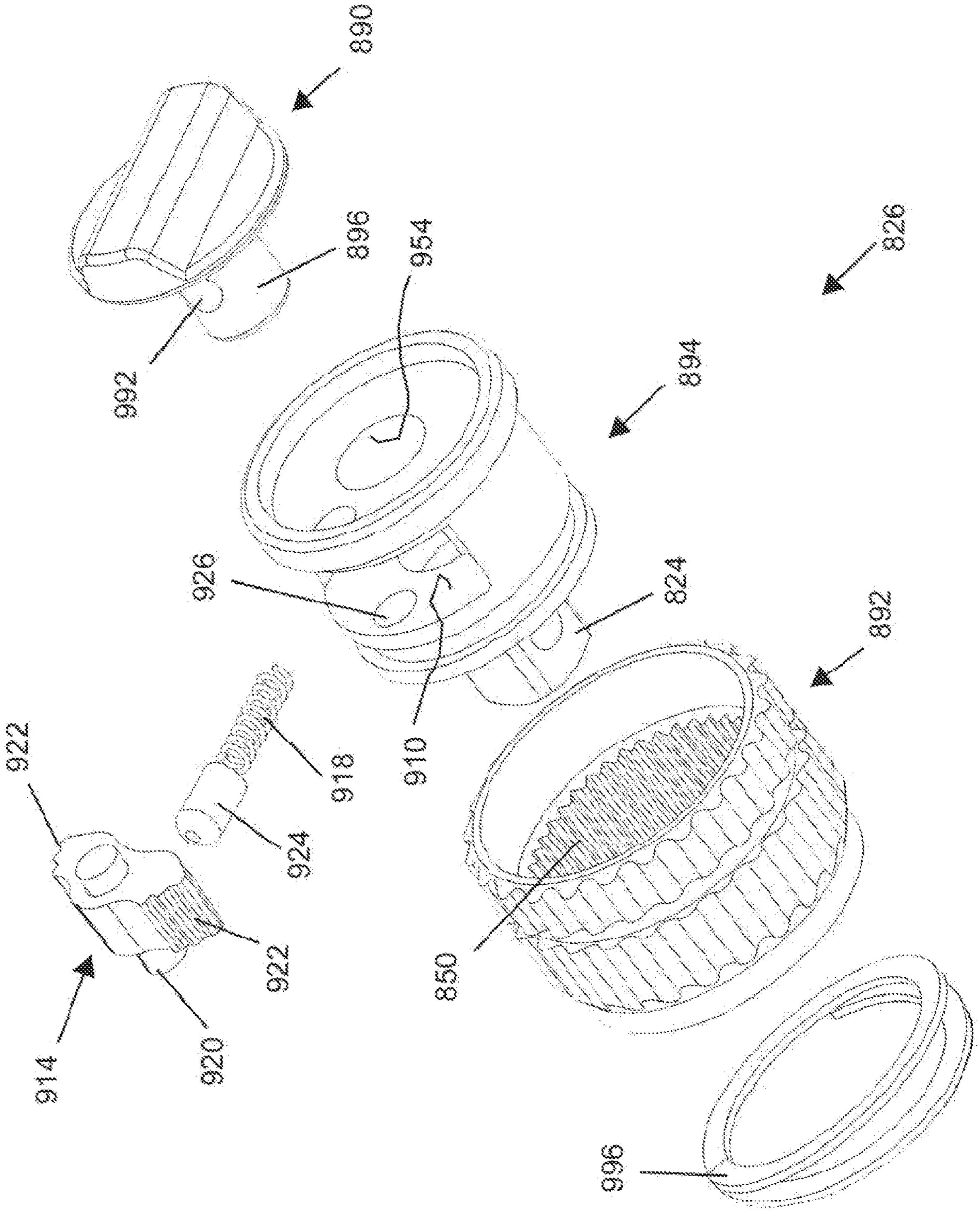
FIG. 10 is an exploded view of a ratchet assembly according to another embodiment.

FIG. 10 illustrates a ratchet assembly 826 according to another embodiment. For the purposes of brevity, features of the ratchet assembly 826 that are similar to the features of the ratchet assembly 26 are referred to by similar reference numbers, plus 800.

The ratchet assembly 826 includes a main body 894, a switch 890, and a gear ring 892 having an internal tooth surface 850. The main body 894 includes a bore 954 and a cutout 910 extending through an arcuate portion of a wall of the main body 894. The cutout 910 includes a hole 926. In the illustrated embodiment, the hole 926 is oriented parallel to the bore 954. The main body also includes a driver 824 configured to engage a shank or a bit (not shown). The main body 894 also includes a pawl member 914 coupled to a pivot pin 920. The pawl member 914 includes two ends, and each end defines a tooth portion 922. The pivot pin 920 is received within the hole 926 of the main body 894 such that the pawl member 914 can pivot about the pivot pin 920 relative to the main body 894. The tooth portions 922 alternately engage the internal tooth surface 850 depending on the position of the pawl member 914. In the illustrated embodiment, a helical washer or spring 996 biases the gear ring 892 into axially to maintain engagement between the gear ring 892 and the main body 894.

The switch 890 includes a protruding pin 896 received within the bore 954 of the main body 894. The pin 896 includes a hole 992 extending perpendicular to the pin 896. When the switch 890 is assembled with the main body 894, the hole 992 is aligned with the cutout 910. A piston 924 is positioned within the hole 992 and is biased outwardly from the hole 992 by a spring 918. The piston 924 is biased into engagement against the pawl member 914. When the switch 890 is rotated to a first position, the piston 924 biases a first tooth portion 922 outwardly to engage the internal tooth surface 850; when the switch 890 is rotated to a second position, the piston 924 biases a second tooth portion 922 outwardly to engage the internal tooth surface 850. In each position, applying a torque on the gear ring 892 in one direction will drive the main body 894 (and therefore also the driver 824) to rotate, while applying a torque to the gear ring 892 in an opposite direction will cause the main body 894 to ratchet or rotate relative to the gear ring 892.

In the embodiment of FIG. 10, the gear ring 892 is secured within a handle (not shown) and the main body 894 is rotatable relative to the gear ring 892. The embodiment of FIG. 10 provides a compact ratchet assembly 826.

Thus, the invention may provide, among other things, a screwdriver. Although the invention has been described in detail with reference to certain independent embodiments, variations and modifications exist within the scope and spirit of one or more independent aspects of the invention as described.

What is claimed is:

1. A screwdriver comprising:

a handle comprising:

a first end;

a second end;

an axis extending from the first end to the second end;

a body portion, the body portion including a plurality of openings extending through the body portion in a direction parallel to the axis and angularly spaced apart about the axis at a first position; and a neck portion including an outer surface defining a diameter less than a diameter of the body portion, wherein the outer surface is a radially outward facing surface;

a shank coupled to the handle, the shank including a first end and a second end, the second end having a bore; and a removable bit selectively positionable in the bore of the shank and within the body portion;

wherein the handle further comprises a rim positioned proximate the second end such that the rim is positioned between the shank and the body portion, wherein the diameter of the outer surface of the neck portion is less than a diameter of the rim;

wherein each of the openings is configured to support the removable bit such that a working end of the removable bit is positioned behind the rim, in a direction extending away from the shank; and wherein, when the removable bit is positioned in one of the plurality of openings, the removable bit is coupled along the outer surface of the neck portion and radially external relative to the outer surface of the neck portion.

2. The screwdriver of claim 1, further comprising a ratchet assembly including a first end secured relative to the handle and a second end coupled to the first end of the shank such that the ratchet assembly is located along the axis between the rim and the shank.

3. The screwdriver of claim 1, wherein the handle further comprises a plurality of openings extending in a direction parallel to the axis and angularly spaced apart about the axis at a second position, wherein the second position is separated a distance along the axis from the first position.

4. The screwdriver of claim 1, wherein the handle includes a bore extending at least partially along the axis and defining an opening proximate the second end.

5. The screwdriver of claim 1, further comprising a cap positioned adjacent the first end of the handle and directly coupled to the neck portion.

6. The screwdriver of claim 1, wherein, when the removable bit is positioned in at least one of the plurality of openings, the removable bit is positioned externally relative to the outer surface of the neck portion.

7. The screwdriver of claim 1, wherein, when the removable bit is positioned in at least one of the plurality of openings, the working end of the removable bit is positioned outside the body portion of the handle.

8. The screwdriver of claim 1, further comprising an opening in the handle extending along the axis and a cap coupled to handle such that the opening is closed.

* * * * *